July 18, 1933.    W. R. WEBSTER    1,918,675
BREAD SLICING APPLIANCE
Filed July 10, 1931    2 Sheets-Sheet 1
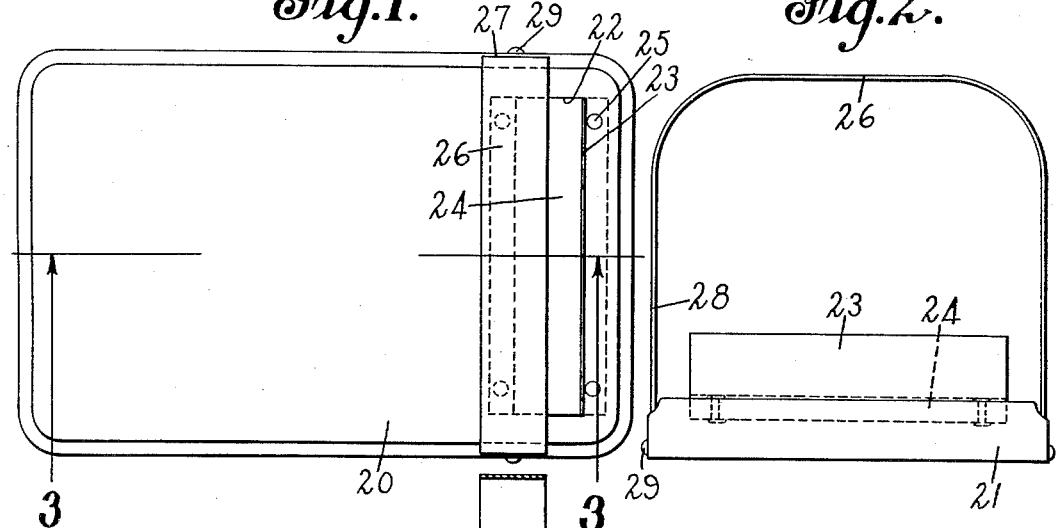
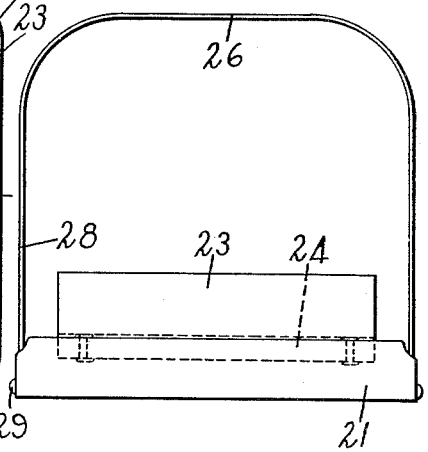
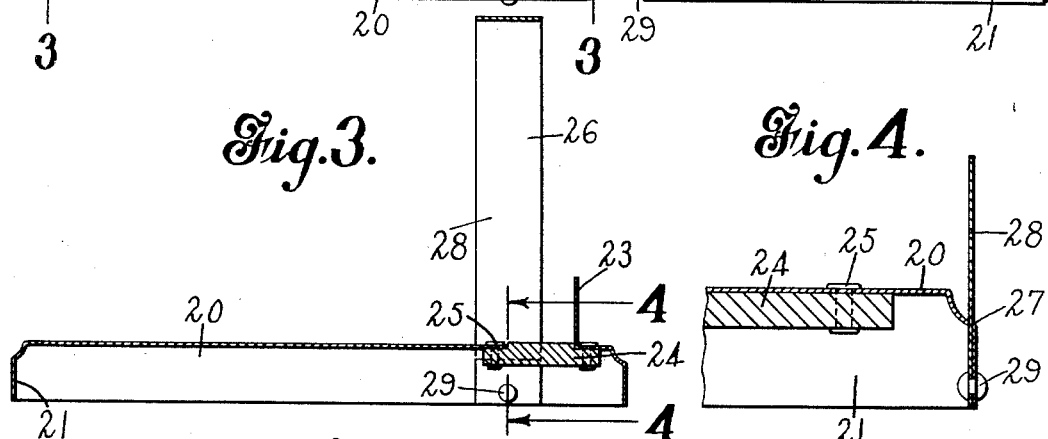
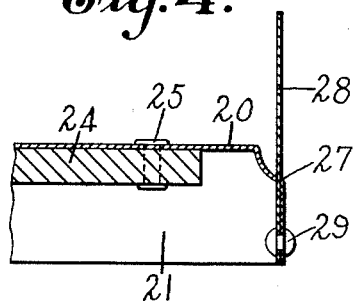
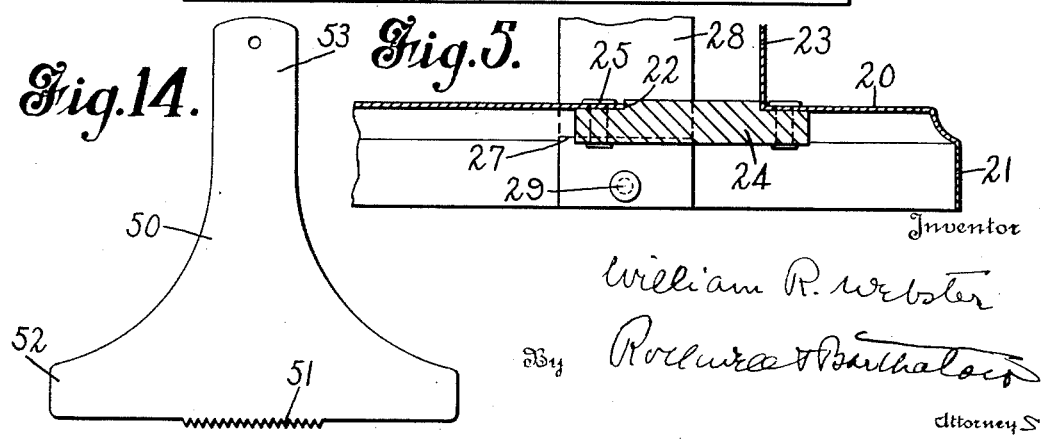
Inventor
William R. Webster
By Roemer & Bartholow
Attorneys

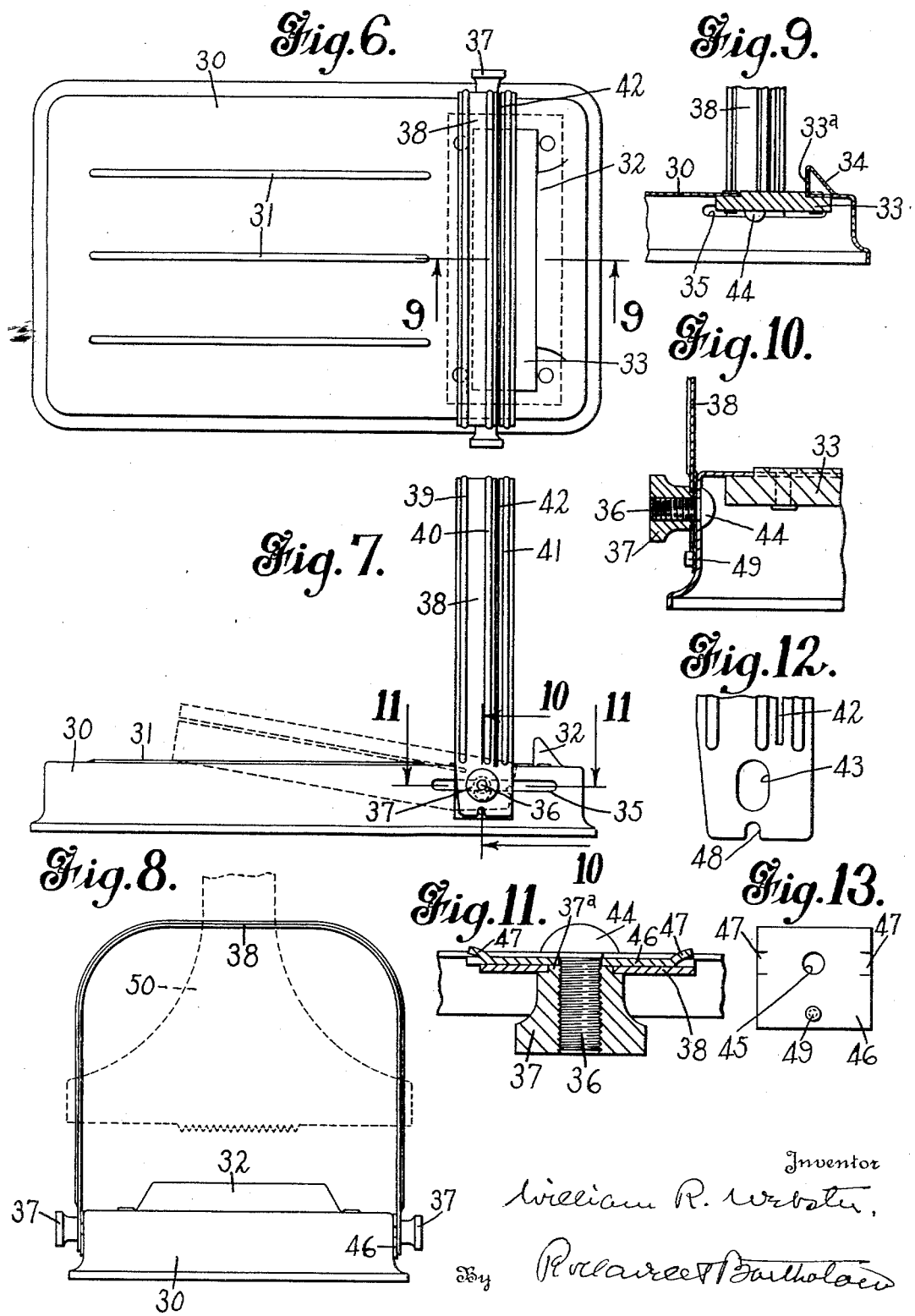

Patented July 18, 1933

1,918,675

UNITED STATES PATENT OFFICE

WILLIAM R. WEBSTER, OF BRIDGEPORT, CONNECTICUT

BREAD SLICING APPLIANCE

Application filed July 10, 1931. Serial No. 549,902.

This invention relates to appliances used in slicing bread and it has particular reference to a small portable device for use in homes and elsewhere which facilitates the cutting of a loaf of bread into slices of a proper or desired thickness which are neatly and evenly cut. In preparing bread for toasting, for example, it is desirable that the thickness of the slices be controlled so that they will be properly adapted to the toaster used, and in many cases it is desirable to cut a number of slices of bread which are of substantially uniform thickness.

One of the objects of my invention is to provide a simple and effective device to be used in connection with the bread slicing knife in such a manner that these objects will be attained.

Another object is to provide means for holding a loaf of bread and positioning and guiding the knife so that a slice of the desired thickness and of uniform thickness throughout can be readily cut by the use of an ordinary bread knife.

Another object is to provide a simple, compact and efficient form of bread slicing appliance which can be manufactured at relatively slight expense and which forms a convenient and attractive article for use in dining rooms, kitchens and elsewhere.

To these and other ends, the invention consists in the novel features and combinations of parts to be hereinafter described and claimed.

In the accompanying drawings:

Fig. 1 is a top plan view of one form of bread slicing appliance constructed in accordance with my invention;

Fig. 2 is an end elevation of the same;

Fig. 3 is a longitudinal section on line 3—3 of Fig. 1;

Fig. 4 is an enlarged fragmentary section on line 4—4 of Fig. 3;

Fig. 5 is an enlarged view of a portion of Fig. 3;

Fig. 6 is a top plan view of an appliance of somewhat modified form;

Fig. 7 is a side elevation of the appliance shown in Fig. 6;

Fig. 8 is an end elevation of the device shown in Figs. 6 and 7;

Fig. 9 is a section on line 9—9 of Fig. 6;

Fig. 10 is an enlarged section on line 10—10 of Fig. 7;

Fig. 11 is an enlarged section on line 11—11 of Fig. 7;

Fig. 12 is a fragmentary detail view of one of the lower end portions of the bail;

Fig. 13 is a detail of the bail-supporting slide;

Fig. 14 is a detail view of an element used in holding a piece of meat on the base in position for slicing, and Fig. 15 is a side elevation of a device similar to that shown in Fig. 6 but having a somewhat modified form of base.

In the preferred form of my appliance the same is characterized by a generally rectangular base preferably formed of sheet metal such as brass, adapted to support on its upper surface a loaf of bread or other article of food to be sliced, and having adjacent one end and associated with the upper surface thereof at such end an inlay of wood or the like, upon which the slicing knife descends. In proximity to the wooden or like inlay is an abutment on the base acting as a stop against which the end of the loaf of bread may be abutted; and extending transversely of the base is a bow-like member or bail suitably spaced from the stop above mentioned and adapted to act as a guide for the slicing knife.

In the form shown in Figs. 1 to 5 inclusive, the generally rectangular base is shown at 20, and it will be observed that such base preferably has rounded corners as shown and is provided with a continuous downturned flange 21 which extends around the outer boundary of the base and is adapted to rest on the table in such a manner that the sheet or web of metal forming the top wall of the base is spaced upwardly from the table surface to a suitable extent so as to provide a light hollow base of convenient form.

In the main portion of the sheet metal base adjacent one end thereof is provided an elongated opening 22 formed by slitting the sheet and bending up therefrom a stop or abutment 23 which extends perpendicularly to the general plane of the base, transversely of the base, and is adapted to act as a stop for the loaf of bread or the like placed on the base. By bending up a portion of the upper base wall at right angles or substantially right angles to its initial plane, the stop 23 is produced and at the same time the opening 22, which opening is subsequently filled by a wooden or like element against which the cutting knife is adapted to contact. In the form shown, the inlay is formed by an elongated wooden block 24, rabbeted at its upper face along its side margins so as to produce a portion which snugly fits the opening 22 and projects slightly above the surface of the metal portion of the base, as shown more particularly in Fig. 5. After being placed in position in this manner, the wooden piece is securely held in place, for example, by rivets or similar members 25 extending through the upper metal wall of the base and through the side portions of the wooden piece, as shown.

Spaced at a suitable distance from the abutment or stop 23 is a bow-like member or bail for guiding the cutting knife, which bow-like member or bail, in this instance, is rigid with the base. The bail member is shown at 26, and it is of generally U-shape and constructed preferably of sheet metal of suitable gauge having depending portions or legs adapted to be secured in a suitable manner to the base at opposite sides of the latter. In the form shown, the base is ornamentally grooved or channeled in the zone where the side wall or flange joins the top wall or web, and within this grooved or channeled portion at opposite sides of the base short slots 27 are cut which enable the lower end portions of the legs 28 of the bail to be passed through the base wall and to lie against the inner face of the side wall of the base and to be secured thereto as by rivets 29, as shown particularly in Fig. 4. As the bail legs fit the slots 27 snugly, that is to say, without play, it is possible to hold the bail securely in position on the base by riveting each extremity of the bail to the adjacent base wall by a single rivet.

It will be understood that in the use of this device the loaf of bread or the like will be laid upon the base and pushed through the bail against the stop 23. A suitable knife will then be used to cut off a slice of bread, during which operation the knife will be held in continuous contact with that edge of the bail which is located adjacent the stop 23. When the device is used in this way a slice of suitable thickness will be cut and if care is exercised in holding the loaf against the stop all portions of the slice will be of uniform thickness. After the first slice has been removed the loaf is then advanced again into contact with the stop or abutment and the operation is repeated. In this manner a number of slices of uniform dimensions can be readily produced in a convenient manner.

In the form shown in Figs. 6 to 13 inclusive, provision is made for adjusting the knife-guiding bail or element relatively to the stop so that the thickness of the slices cut can be regulated as desired. There are also certain differences of detail construction. The base 30 is of the same general form previously described, but in this case has strengthening ribs 31 upon its upper surface, and the stop member 32 is of more rugged construction than that shown in the first form. In this particular case, the wooden block or inlay 33 is rabbeted across the ends as well as along the two sides. A rectangular portion of the wooden block or piece projects above the plane of the base as previously described, but in this instance, the stop or abutment 32, which is constituted by the piece of metal bent up out of the opening for the block, is of hollow construction being substantially triangular in cross-section. A portion 33ª is bent up to form an upright wall against which the loaf contacts and a sheet metal portion 34 integral with portion 33ª is bent downward and suitably connected to the base body, as by brazing or soldering, to provide a hollow reinforced abutment.

Beneath the wooden insert 33 the side walls of the hollow sheet metal base are provided with longitudinal slots 35 in which are received screws 36 having threaded engagement with nuts 37 by means of which the bow-like knife guide or bail 38 is held in position. In this case, the knife guide 38 can be adjusted in the direction of the slots 35, that is to say, lengthwise of the base, so that the distance from the abutment surface 33ª to the knife-guiding surface can be adjusted as desired. In this particular case the bail is strengthened by corrugating it, so as to produce the corrugations 39, 40 and 41. In this form, the knife is guided directly in the body of the bail and for that purpose the bail is provided with a slit 42 which is preferably located to one side of the median plane of the bail and may be conveniently formed between the corrugations 40 and 41, as shown. At each extremity of the bail the same is provided with a longitudinally elongated slot 43 through which the corresponding screw member 36 can be passed. This screw member has an integral head 44 located at the inner face of the side wall of the base and in contact therewith. The shank of each screw 36 projects through an opening 45 in a slide piece 46 having struck-up ears 47 by means of which said slide piece is guided in the slot 35. As shown particularly in Figs. 11, the body of the slide piece 46 is located at the outer face of the side wall of the base, but the lugs or ears 47 at the sides of the slide piece project back into the slot 35 so that while the slide can move longitudinally of the base it cannot have any turning movement. Located at the outer face of the slide piece is the lower extremity of the bail 38. At its lower edge the bail is provided with a small notch 48 adapted to engage a small rivet 49 projecting outwardly from the slide piece 46. It will, therefore, be understood that with the edges of the slot 43 of the bail engaging a reduced portion or neck 37ª of nut 37, and the notched lower edge of the bail engaging the pin or rivet 49 on the slide piece, the bail under normal conditions will be effectively prevented from tilting out of its upright position, but that adjustment of the bail lengthwise of the base is permitted by the adjustability of the carrying slide pieces in the slots in which they are guided. It will also be understood that if it be desired to transport the device or to store it, it will be possible to fold the upstanding bow or bail down into the inoperative position shown in dotted lines in Fig. 7, wherein the upper end of the bail is caused to contact with the upper surface of the base. This folding down of the bail is possible owing to the fact that it can be raised slightly relatively to the screws 36 owing to the provision of the elongated slots 43, and upon raising the bail the notches 48 can be caused to disengage the pins 49 so that the bail can thereafter be swung downward to the inoperative position previously mentioned.

It will be understood that in using this appliance, the bail will be adjusted longitudinally of the base so as to make the distance from the slit or kerf 42 to the abutment 32 a proper one for the thickness of slice which it is desired to cut. This adjustment can be readily effected by loosening the nuts 37 and moving the bail and its supports in the proper direction relatively to the abutment. The slit or kerf 42 forms a guide in which the slicing knife can be very accurately guided, and after a slice of the desired thickness has been cut any additional number of slices of the same thickness can be cut as desired. Then, if it is desired to provide thinner or thicker pieces a suitable adjustment of the bail for that purpose can be readily made.

This device can also be used in the slicing of meat, if desired. In such case, an approximately T-shaped holder 50 can be used for holding the piece of meat in position, this holder being introduced into the slit or kerf in the bail in which it is held in place. After being introduced into the slit in the bail and caused to contact with the piece of meat, sausage, or the like, the hand of the operator can be held on the holder 50 so as to maintain the meat in position in an effective manner while it is being sliced, it being understood that in such case the knife will be guided by that edge of the bail which is nearest to the positioning abutment, as in the form of appliance shown in Figs. 1 to 5 inclusive. The lower edge of the holder 50 is preferably toothed or serrated as shown at 51, so that it will not permit slipping of the product being held, and it will be understood that the terminals 52 of the head portion of the holder are engaged in the slit 42 and that the holder 50 can be firmly held against the product by reason of the fact that such holder is provided with an upwardly extending handle portion 53 adapted to project above the top of the bail under ordinary conditions, as shown by the dotted lines in Fig. 8 of the drawing.

In Fig. 15 I have shown a form of device which is quite similar to that shown in Figs. 6 to 13 inclusive, but in this case the bail can be folded farther down than in the case previously described, inasmuch as a special transverse groove 54 is provided in the upper face of the base to receive the curved upper portion of the bail 55.

Various changes can be made in the details of the construction without departing from the principle of my invention, and it will be understood that I have not attempted to illustrate and describe all of the modifications which may be made without departure from the scope of my invention, as defined in the following claims.

What I claim is:

1. An appliance for use in cutting bread or the like comprising a base member having slots in the side walls thereof, slide pieces guided in said slots, a bow-like knife-guiding element having its ends pivotally mounted upon said slide pieces, and means upon which said knife-guiding element ends are pivoted for securing said slide pieces in their adjusted positions in said slots and for securing said knife-guiding element to said slide pieces.

2. An appliance for use in cutting bread or the like comprising a hollow base member having longitudinal slots in the side walls thereof, slide pieces guided in said slots, a bow-like knife-guiding element carried by said slide pieces and having its ends mounted thereon so that it is adapted to swing thereon in order to fold down against the base, locking means between one of said knife-guiding element ends and one of said slide pieces to prevent swinging movement of said element and common means for securing each of said slide pieces in their adjusted positions in said slots and said knife-guiding element end in locked position.

3. An appliance for use in cutting bread or the like comprising a hollow base member having longitudinal slots in the side walls thereof, slide pieces guided in said slots, a bow-like knife-guiding element carried by said slide pieces and having its ends mounted thereon so that it is adapted to swing thereon in order to fold down against the base, and common means for securing each of said slide pieces in their adjusted positions in said slots and for clamping each knife-guiding element to said slide piece in the position to which it has been swung.

4. An appliance for use in cutting bread or the like, comprising a base member having sides extending substantially at right angles therefrom, each side having a longitudinally directed slot formed therein, a slide piece guided in each slot and resting against the base side adjacent thereto, a threaded stud extending through each of said slots and said slide pieces, a nut on each threaded stud to clamp each side piece to the base member side adjacent thereto, and a bow-like knife-guiding element with one of its ends pivotally mounted upon each of said nuts and clampingly engaged thereby to secure it to the slide piece adjacent thereto.

5. An appliance for use in cutting bread or the like, comprising a base member having sides extending substantially at right angles therefrom, each side having a longitudinally directed slot formed therein, a slide piece guided in each slot and resting against the base side adjacent thereto, a threaded stud extending through each of said slots and said slide pieces, a nut on each threaded stud to clamp each side piece to the base member side adjacent thereto, a bow-like knife-guiding element with one of its ends pivotally mounted upon each of said nuts and clampingly engaged thereby to secure it to the slide piece adjacent thereto, and locking means between one of said slide pieces and one end of said knife-guiding element to retain said knife-guiding element against pivotal movement with respect to said nuts.

6. An appliance for use in cutting bread or the like, comprising a base member having sides extending substantially at right angles therefrom, each side having a longitudinally directed slot formed therein, a slide piece guided in each slot and resting against the base side adjacent thereto, a bow-like knife-guiding element with one of its ends disposed against each of said slide pieces, and common means for clamping one of said knife-guiding element ends to the slide piece adjacent thereto and for clamping said slide piece to the base side adjacent thereto, said common means comprising a part passing through said base side, said slide piece and said knife-guiding element end and another part cooperating with the first part to draw said elements together into clamped relation.

7. An appliance for use in cutting bread or the like, comprising a base member having sides extending substantially at right angles therefrom, each side having a longitudinally directed slot formed therein, a slide piece guided in each slot and resting against the base side adjacent thereto, a bow-like knife-guiding element with one of its ends disposed against each of said slide pieces, common means for clamping one of said knife-guiding element ends to the slide piece adjacent thereto and for clamping said slide piece to the base side adjacent thereto, said common means comprising a part passing through said base side, said slide piece and said knife-guiding element end and another part cooperating with the first part to draw said elements together into clamped relation, said knife-guiding element end being rotatable about said common means.

8. An appliance for use in cutting bread or the like, comprising a base member having sides extending substantially at right angles therefrom, each side having a longitudinally directed slot formed therein, a slide piece guided in each slot and resting against the base side adjacent thereto, a bow-like knife-guiding element with one of its ends disposed against each of said slide pieces, common means for clamping one of said knife-guiding element ends to the slide piece adjacent thereto and for clamping said slide piece to the base side adjacent thereto, said common means comprising a part passing through said base side, said slide piece and said knife-guiding element end and another part cooperating with the first part to draw said elements together into clamped relation, said knife-guiding element end being rotatable about said common means, and disconnectable means between said slide piece and said knife-guiding element end to prevent such rotation.

9. In a bread slicer or the like, a base, a bow-like knife-guiding element straddling said base with its ends disposed one at either side thereof, means to secure said element to said base to permit relative swinging movement and adjustment thereof longitudinally of said base, said means comprising slide pieces disposed one upon either side of said base between the latter and the knife-guiding element end, cooperating means between said slide piece and said base permitting relative longitudinal sliding movement therebetween, and common means to clamp one of said element ends and one of said slide pieces together and to said base, said element end being pivotally mounted upon said clamping means.

10. In a bread slicer or the like, a base, a bow-like knife-guiding element straddling said base with its ends disposed one at either side thereof, means to secure said element to said base to permit relative swinging movement and adjustment thereof longitudinally of said base, said means comprising slide pieces disposed one upon either side of said base between the latter and the knife-guiding element end, cooperating means between said slide piece and said base permitting relative longitudinal sliding movement therebetween, common means to clamp one of said element ends and one of said slide pieces together and to said base, said element end being pivotally mounted upon said clamping means, and cooperating and disconnectable means between one of said element ends and one of said slide pieces to prevent pivotal movement of said element when it is disposed in operative position.

11. In a bread slicer or the like, a base, a bow-like knife-guiding element straddling said base with its ends disposed one at either side thereof, means to secure said element to said base to permit relative swinging movement and adjustment thereof longitudinally of said base, said means comprising slide pieces disposed one upon either side of said base between the latter and the knife-guiding element end, cooperating means between said slide piece and said base permitting relative longitudinal sliding movement therebetween, common means to clamp one of said element ends and one of said slide pieces together and to said base, said element end being pivotally mounted upon said clamping means, cooperating and disconnectable means between one of said element ends and one of said slide pieces to prevent pivotal movement of said element when it is disposed in operative position, and cooperating means between one of said element ends and said clamping means to permit disconnection of said pivotal movement preventing means.

WILLIAM R. WEBSTER.